United States Patent [19]

Thompson et al.

[11] Patent Number: 4,457,317
[45] Date of Patent: Jul. 3, 1984

[54] METHOD OF REMOVAL OF PAPER WRAPS FROM CIGARETTE FILTER RODS

[75] Inventors: James M. Thompson; David L. Denton, Kingsport, both of Tenn.

[73] Assignee: Eastman Kodak Company, Rochester, N.Y.

[21] Appl. No.: 406,630

[22] Filed: Aug. 9, 1982

[51] Int. Cl.³ .............................................. A24C 5/36
[52] U.S. Cl. .................... 131/96; 156/244.13; 156/247; 156/344; 156/584
[58] Field of Search ............... 156/244.13, 344, 584, 156/247; 131/96, 280

[56] References Cited

U.S. PATENT DOCUMENTS

| | | | |
|---|---|---|---|
| 2,894,868 | 7/1959 | Hyde | 156/344 |
| 3,352,736 | 11/1967 | Kulwicki | 156/247 |
| 3,883,384 | 5/1975 | Hopkins | 156/244.13 |
| 4,261,790 | 4/1981 | Brinker et al. | 156/344 |

Primary Examiner—Vincent Millin
Attorney, Agent, or Firm—Malcolm G. Dunn; Daniel B. Reece, III

[57] ABSTRACT

Method of removing paper wraps that are secured by thermoplastic adhesive around and/or to waste cigarette filter rods to enable subsequent recovery of the filter material in the cigarette filter rods, the method including the step of heating the cigarette filter rods to the melting point of the thermoplastic adhesive and then agitating the paper wrap against the filter material to obtain separation of the paper wrap therefrom.

12 Claims, 5 Drawing Figures

U.S. Patent
Jul. 3, 1984
4,457,317
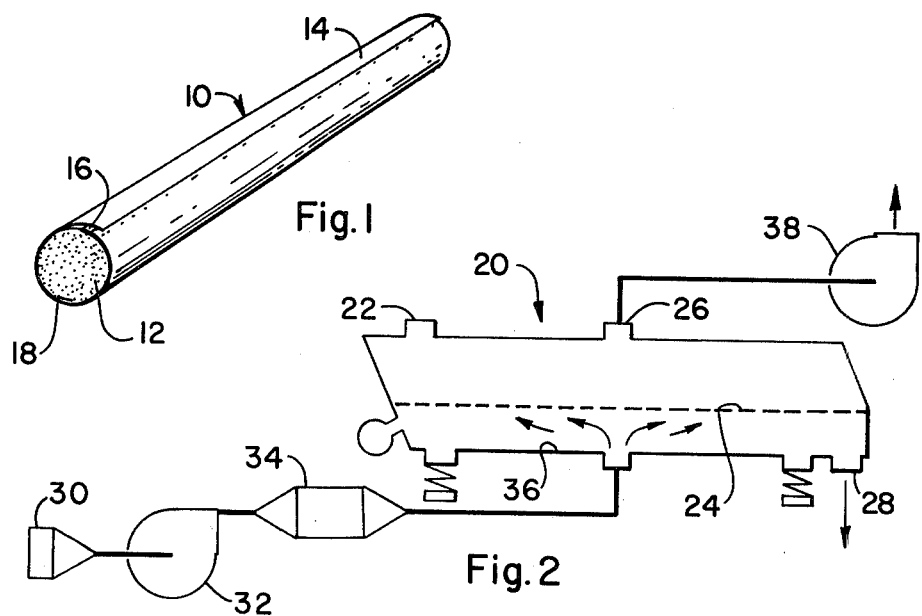
Fig. 1
Fig. 2
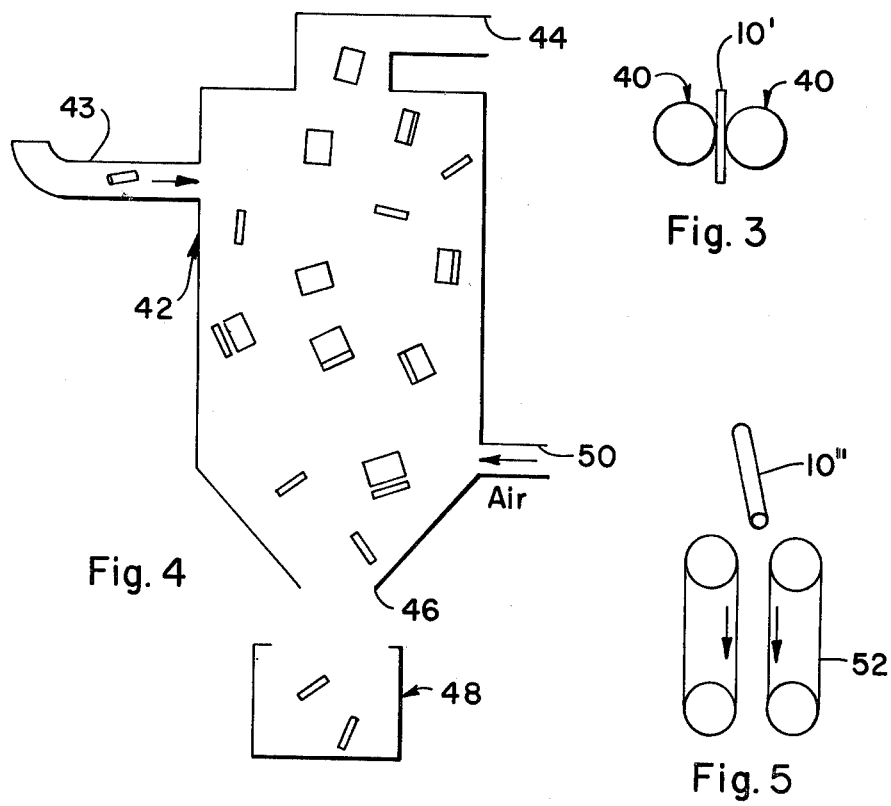
Fig. 4
Fig. 3
Fig. 5

METHOD OF REMOVAL OF PAPER WRAPS FROM CIGARETTE FILTER RODS

DESCRIPTION

1. Technical Field

The present invention is directed to a method for removing paper wraps that are secured by thermoplastic adhesive around and/or to waste cigarette filter rods to enable subsequent recovery of the filter material in the cigarette filter rods.

2. Background Art

In manufacturing cigarette rods, the filter material generally used for such filter rods is cellulose acetate filter tow made from staple or continuous filaments which is bloomed and formed on highspeed machinery called "filter rod makers" to form filter rods or plugs. These filter rods are paper wrapped cylindrical units each being about 66 mm to about 150 mm in length and about 4 mm to about 10 mm in diameter, and may be plasticized. Each filter rod normally contains enough material for either four or six filter tips or elements which are later attached to cigarettes on a cigarette-forming machine. In processing filter tow on a filter rod maker, a certain amount of waste or reject filter rods will occur which cannot be used and which must be disposed of in some manner. In the past it has often been disposed of by burning, disposal in a landfill or sold for low-grade packing material.

In order to recover the filter material for reuse, attempts have been made to dissolve the waste cigarette filter rods in acetone to form an acetate/-acetone dope which may be put in a regular process dope stream prior to filtration. A method is still required, however, to remove the paper prior to the dissolving step because the paper wrap is of such volume in the acetate/acetone dope that it blinds even the coarsest screening device.

The problem, therefore, is to find a suitable and economical method for removing the paper wraps from waste cigarette filter rods prior to making any attempt to recover the filter material of the rod.

U.S. Pat. No. 3,339,703 discloses an apparatus for taking randomly oriented cigarettes and orienting them end to end so that they may be fed to longitudinal slitting knives which slit the paper along the length of the cigarettes for subsequent recovery of the tobacco contained therein.

U.S. Pat. No. 3,615,997 discusses salvaging filter elements by first passing cigarettes through a device for removing tobacco enclosed within the cigarette paper wrapper attached to the filter element without cutting the paper wrapper. The patent then mentions the necessity of separating the filter elements from the cigarette paper wrapper, but does not state how this would be accomplished. Next the filter elements are positioned into an end-to-end orientation and slit longitudinally in a manner similar to that disclosed in the above-mentioned U.S. Pat. No. 3,339,703. The result is that mechanical means chop the short rods into individual longitudinally fractured short filamentary segments about either 20 mm or 40 mm long. The fractured fiber segments will have a large number of fibers with residual protuberances. The mass of fractured fibers is then passed through a conventional hammer mill and huller cleaner to separate out and remove any residual fragments of paper which remain in the mass of shredded fibers. Following the shredding operation, the cut fibers are passed into a large mixing hopper where a tumbling and rapidly rotating motion blends and comingles a measured quantity of the short fibers with a weighed quantity of reinforcing fibers derived from other sources. The blending operation is followed by the use of a conventional fiber picker which aligns, opens and separates the fibers and forms a mat of individual fibers; and then a carding drum is used to pick the mat into a thin web. The thin web may then be plasticized in a suitable manner as described in the patent, and then formed into a shaped rod.

The present invention is directed to a much simpler method for removing the paper wraps so that the filter material from the waste cigarette filter rod may thereafter be recovered for reuse.

DISCLOSURE OF INVENTION

In accordance with the present invention we provide a method for removing paper wraps that are secured by thermoplastic adhesive around and/or to waste cigarette filter rods to enable subsequent recovery of the filter material in the cigarette filter rods by heating the waste cigarette filter rods to the melting point of the thermoplastic adhesive; and then separating the paper wraps from the waste cigarette filter rods.

By "waste cigarette filter rods" we mean cigarette filter rods that have been rejected for some reason during the manufacturing process of the cigarette filter rods, or cigarette filter rods that have been rejected or reclaimed from the manufacture of cigarettes. Such "waste" cigarette filter rods may each have one or more paper wraps that encircle the filter material consitituting the heart of the filter rod. Each encircling paper wrap is usually secured by thermoplastic adhesive to itself at the over-lap of the paper, and may also be further secured by a bead of thermoplastic adhesive applied on and along the length of the filter material so as to ensure adherence of the paper wrap to the filter material in its rod-like form.

The step of heating the waste cigarette filter rods may include blowing a heated gas around the waste cigarette filter rods.

The step of removing the paper wraps may include agitating the paper wraps against the filter material of the waste cigarette filter rods to obtain separation of the paper wraps from around the cigarette filter rods.

The step of heating the waste cigarette filter rods may include fluidizing the waste cigarette filter rods over a fluidized bed with a heated gas rising from the bed.

The step of heating the waste cigarette filter may include heating to a temperature from about 80° C. to about 200° C.

The steps of heating the waste cigarette filter rods and separating the paper wraps may include fluidizing by a heated gas the waste cigarette filter rods in floating suspension over a fluidized bed, the waste cigarette filter rods being agitated against each other by the rising heated gas until the paper wraps become released from around the waste cigarette filter rods, and then suspending the lighter weighing paper wraps still higher above the heavier waste cigarette filter rods in the fluidized heated gas for subsequent separate removal of the paper wraps and of the remaining material of the waste cigarette filter rods from the fluidized bed.

The steps of heating the waste cigarette filter rods and separating the paper wraps may include feeding and engaging the waste cigarette filter rods through and between oppositely rotated heated rolls, and preferably one of the oppositely rotated rolls may rotate at a slower speed than the other oppositely rotated roll. The step of separating the paper wraps from the waste cigarette filter rod may include air separating the lighter weighing paper wraps away from the heavier weighing waste cigarette filter rods.

The steps of heating the waste cigarette filter rods and separating the paper wraps may include feeding and engaging the waste cigarette filter rods through and between oppositely rotated heated endless belts, and preferably one of the oppositely rotated belts may rotate at a slower speed than the other oppositely rotated belt. The step of separating the paper wraps from the waste cigarette filter rod may include air separating the lighter weighing paper wraps away from the heavier weighing waste cigarette filter rods.

BRIEF DESCRIPTION OF DRAWINGS

Details of our invention will be described in connection with the accompanying drawings, in which:

FIG. 1 is a perspective view of a cigarette filter rod;

FIG. 2 is a schematic view in elevation of a fluidized bed;

FIG. 3 is a schematic view in elevation of oppositely rotated heated rolls;

FIG. 4 is a schematic elevational view of an air separation system; and

FIG. 5 is a schematic view in elevation of oppositely rotated heated endless belts.

BEST MODE FOR CARRYING OUT THE INVENTION

In reference to the drawings, FIG. 1 illustrates a cigarette filter rod 10 showing the filter material 12 such as cellulose acetate, and an outer paper wrap 14. Typically the paper wrap is adhesively secured to itself around the rod-like formed filter material. The outer wrap of paper is the size of the perimeter of the rod-like filter material, and is held onto the filter material by an applied bead 16 of thermoplastic adhesive where the paper overlaps about 1 mm. Sometimes, also, one or more other beads of adhesive may be applied along the length of the rod like filter material to further ensure good adhesion of the paper wrap to the filter material; thus 18 illustrates such a bead of adhesive.

Sometimes, too, there may be more than one paper wrap, such as a second paper wrap (not shown), that is used to combine more than one filter element for use in a single filtered cigarette.

The thermoplastic adhesives used are usually hot melt adhesives which have a melt point generally between about 80° C. and 200° C. We have discovered that by heating a filter rod to or near the melt point of the thermoplastic adhesive, only a small amount of energy is thereafter needed to loosen the paper wrap from the rod-like filter material by agitating the paper wrap against the filter material, and then the filter material, generally cellulose acetate, may be more readily recovered by a solution process without interference from the paper wrappers.

One method that may be used for causing release of the paper wrap or wraps from the waste cigarette filter rod is by use of a heated fluidized bed 20, as shown in FIG. 2. The waste cigarette filter rods may be introduced into the feed port 22 and the heated gas, preferably heated air, rising up from the bed through the perforated plate 24 tends to suspend the mass of waste cigarette filter rods slightly above the plate depending, of course, upon velocity and flow rate. The perforated plate may also be vibrated so that the waste cigarette filter rods are agitated against each other and against the confining walls of the fluidized bed. This agitation causes agitation of the paper wrap against the filter material. Once the thermoplastic adhesive has been softened by the heated gas, the paper wraps become readily freed from around the rod-like filter material by the agitation motion. Since the rod-like filter material weighs about five to ten times the weight of the paper wrap, the paper wraps will be supported by the rising heated gas still higher above the fluidized bed than the rod-like filter material. The paper wraps may then be forced out through the outlet port 26 while remaining rod-like filter material to be recovered passes out through the product outlet port 28 for subsequent removal to a solution process.

The gas, preferably air, may be drawn through a filter 30 by fan 32, then heated to a temperature between about 80° C. to about 200° C. by heater 34 before entering the chamber 25 of the fluidized bed 20. The paper wraps may be drawn through the outlet port 26 by fan 38.

Another method that may be employed is to feed the waste cigarette filter rods 10 in random orientation through and in engagement with heated feed rolls 40, a shown in FIG. 3. The mechanical engagement or contact with the oppositely rotated heated rolls, once the thermoplastic adhesive has been softened by the heat, serves to cause a release of the paper wraps from the waste cigarette filter rods. This causes agitation of the paper wrap against the filter material. Preferably one of the heated rolls rotates slower than the other heated roll to enhance the agitation and thus expedite removal of the paper wraps. The mass of rod-like filter materials and paper wraps may then pass from the heated rolls into an air separator 42, such as shown in FIG. 4, through inlet port 43 where the lighter weighing paper wraps become discharged at the top through discharge port 44 while the heavier weighing rod-like filter material passes out through the lower port 46 into receptacle 48 for subsequent transport to a solution process. Air may enter into the air separator by means of air inlet port 50.

FIG. 5 discloses still another method where the waste filter rods 10" are fed in random orientation through and in engagement with oppositely rotated heated endless belts 52. This also causes agitation of the paper wrap against the filter material. Preferably one of the heated endless belts rotates at a slower speed than the other endless belt so as to enhance the agitation and thus expedite removal of the paper wraps. An air separator, such as that shown at 42 in FIG. 4, may also be used at the discharge end of the heated endless belts.

The invention has been described in detail with particular reference to preferred embodiments thereof, but it will be understood that variations and modifications can be effected within the spirit and scope of the invention.

We claim:

1. The method of removing paper wraps that are secured by thermoplastic adhesive around and/or to waste cigarette filter rods to enable subsequent recovery of the filter material in the cigarette filter rods, the method comprising:

heating the waste cigarette filter rods to the melting point of the thermoplastic adhesive; and separating the paper wraps from the waste cigarette filter rods.

2. The method according to claim 1 wherein the step of heating the waste cigarette filter rods includes blowing a heated gas around the waste cigarette filter rods.

3. The method according to claim 1 wherein the step of separating the paper wraps includes agitating the paper wraps against the filter material of the waste cigarette filter rods to obtain separation of the paper wraps from around the cigarette filter rods.

4. The method according to claim 1 wherein the step of heating the waste cigarette filter rods includes fluidizing the waste cigarette filter rods over a fluidized bed with a heated gas rising from the bed.

5. The method according to claim 1 wherein the step of heating the waste cigarette filter rods includes heating to a temperature from about 80° C. to about 200° C.

6. The method according to claim 1 wherein the steps of heating the waste cigarette filter rods and separating the paper wraps include fluidizing by a heated gas the waste cigarette filter rods in floating suspension over a fluidized bed, the waste cigarette filter rods being agitated against each other by the rising heated gas until the paper wraps become released from around the waste cigarette filter rods, and then suspending the lighter weighing paper wraps still higher above the heavier waste cigarette filter rods in the fluidized heated gas for subsequent separate removal of the paper wraps and of the remaining material of the waste cigarette filter rods from the fluidized bed.

7. The method according to claim 1 wherein the steps of heating the waste cigarette filter rods and separating the paper wraps include feeding and engaging the waste cigarette filter rods through and between oppositely rotated heated rolls.

8. The method according to claim 7 wherein one of said oppositely rotated rolls rotates at a slower speed than the other oppositely rotated roll.

9. The method according to claim 7 wherein the step of separating the paper wraps from the waste cigarette filter rod includes air separating the lighter weighing paper wraps away from the heavier weighing waste cigarette filter rods.

10. The method according to Claim 1 wherein the steps of heating the waste cigarette filter rods and separating the paper wraps include feeding and engaging the waste cigarette filter rods through and between oppositely rotated heated endless belts.

11. The method according to Claim 10 wherein the step of separating the paper wraps from the waste cigarette filter rod includes air separating the lighter weighing paper wraps away from the heavier weighing waste cigarette filter rods.

12. The method according to claim 10 wherein one of said oppositely rotated endless belts rotates at a slower speed than the other oppositely rotated endless belt.

* * * * *